(No Model.)  2 Sheets—Sheet 1.

J. DARLING.
CLOTH MEASURING MACHINE.

No. 564,596.  Patented July 28, 1896.

Witnesses
John Imrie
Chas. K. Davies.

Inventor
John Darling
By
W. A. Bartlett
Attorney (No Model.) 2 Sheets—Sheet 2.
J. DARLING.
CLOTH MEASURING MACHINE.

No. 564,596. Patented July 28, 1896.

Witnesses
John Dinnie
Chas. K. Davies.

Inventor
John Darling
By W. H. Bartlett
Attorney

UNITED STATES PATENT OFFICE.

JOHN DARLING, OF LONDON, ENGLAND, ASSIGNOR TO LEONIDAS H. CRESS, OF NEWTON, MASSACHUSETTS.

CLOTH-MEASURING MACHINE.

SPECIFICATION forming part of Letters Patent No. 564,596, dated July 28, 1896.

Application filed June 28, 1895. Serial No. 554,352. (No model.)

*To all whom it may concern:*

Be it known that I, JOHN DARLING, residing at London, in the county of Middlesex, England, have invented certain new and useful Improvements in Cloth-Measuring Machines, of which the following is a specification, reference being had therein to the accompanying drawings.

This invention relates to measuring devices for measuring cloth and similar material in rolls and bolts.

The object of the invention is to produce a measuring device in which a traveling pin or bearer follows the surface of the cloth, whether the same be wound in a spiral or an oval or other usual form of bolt, and by communicating a rotary movement corresponding to the coil will actuate a suitable pointer or register; also to produce a register in which the oblique movement of a part which travels round a center will effect a corresponding shift of a rotating driving-pin; also to proportion the driving-surface in its relation to the register to the travel of the bearer or the cloth, whether the same be in a circle, in a helix, or other coil usual in winding fabric on itself; also to improve measuring and registering implements in various particulars.

Figure 1:
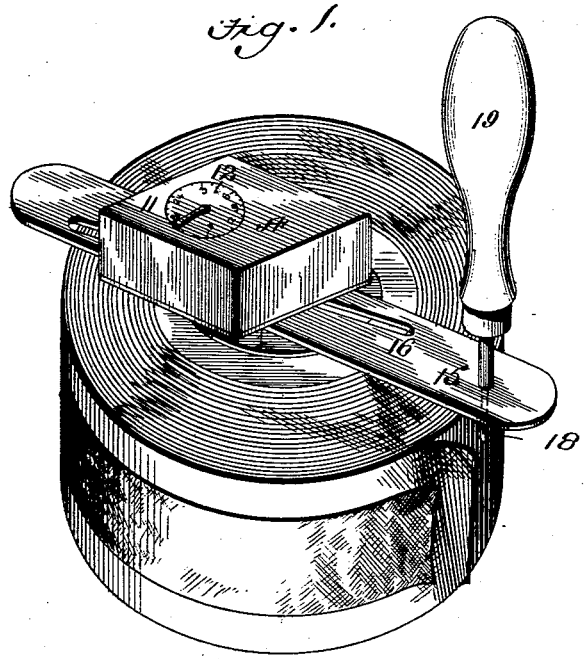
Figure 2:
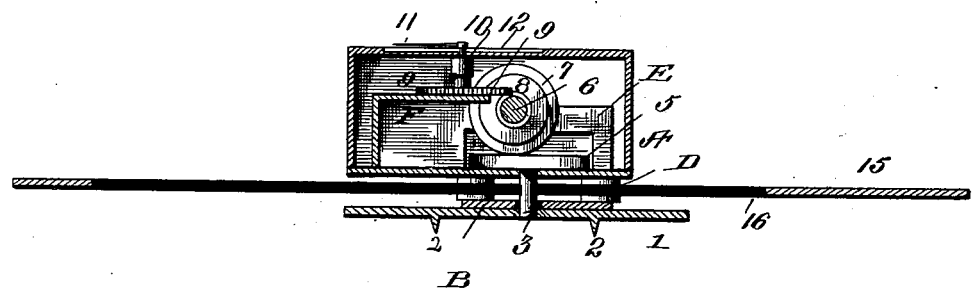
Figure 3:
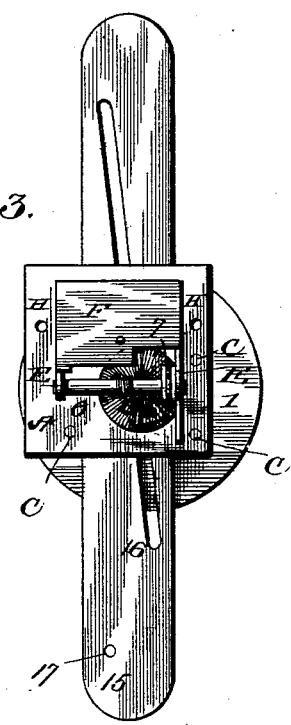
Figure 4:
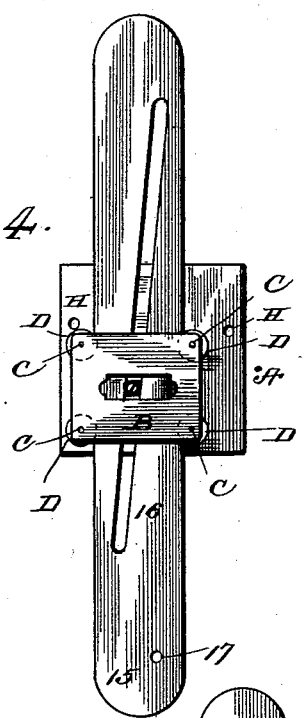
Figure 6:
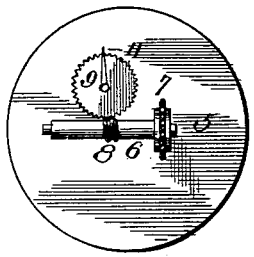
Figure 5:
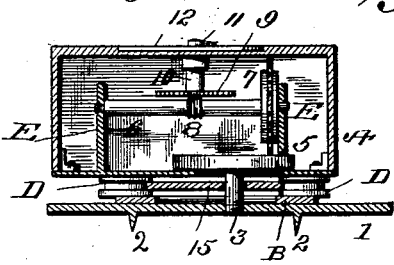
Figure 7:
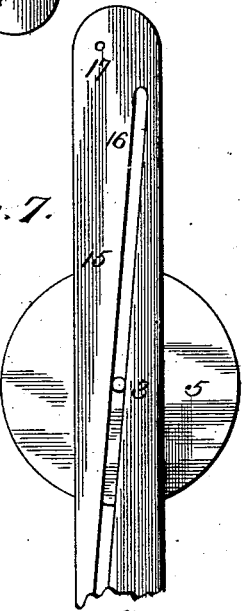

Figure 1 is a perspective view of the cloth-measuring instrument applied to a roll of ribbon as usually wound on a block. Fig. 2 is a longitudinal vertical section through the entire device. Fig. 3 is a plan of the device with the top plate, dial, and index-gear removed. Fig. 4 is a bottom plan with the supporting-base removed. Fig. 5 is a section at right angles to Fig. 2. Fig. 6 is a diagram indicating the relation of driving-gear, with supports removed. Fig. 7 is a broken plan or diagram of the oblique presser and friction driving-wheel.

The numeral 1 indicates the base-plate, which is shown to be a disk, but may be of any convenient form, and is provided with means for holding it to the block or board, these means, as shown, being the points or claws 2 2, which are driven into the ribbon-block. For attachment to a board on which the ribbon is wound in an oval bolt any usual form of clamping device may be substituted for the claws.

The base-plate 1 has a shaft 3 firmly connected thereto, as by a screw-thread, or by an engaging hub or slot, so that the shaft 3 will not turn on its axis independently of the base-plate 1, at least in one direction. The shaft 3 passes through a slot in the bottom of casing A, which casing is preferably a small metallic box, and inside the casing the shaft 3 is rigidly secured to a disk or flat plate 5, which lies just inside the casing.

The casing A has a guide-plate B, attached to the bottom of the casing by four posts C C, and these posts preferably pass through antifriction-sheaves D D. The guide-plate B is slotted in the same direction as the casing A, so that the casing may shift with relation to disk 5, which disk is attached by its shaft 3 to base 1, as has been described. Holes H are merely for the attachment of the posts of the casing in any usual manner.

The casing A carries the transverse shaft 6, journaled in suitable bearings, as E E. This shaft 6 has a wheel or disk 7, the edge of which is in frictional contact with the face of disk 5. The face of disk 5 or the edge of wheel 7 may be covered with rubber, or be finely milled or ground, so as to secure accurate frictional engagement no matter where the edge of wheel 7 comes in contact with the flat face of disk or plate 5.

From the construction so far described it follows that, if the casing A be rotated about the shaft 3 as a center of movement, the wheel 7 will travel along the face of wheel or plate 5, and will be put into rotation by its frictional engagement therewith, and the speed of rotation of this wheel 7 and its rigidly-connected shaft 6 will depend on the distance of the frictional engagement from the center 3, since in traveling a circle near the periphery of plate 5 the wheel 7 goes over a longer track than it does in a circle near the center, and if the casing A be put in rotation about the shaft 3 the speed of rotation of wheel 7 and shaft 6 will depend on the position of the casing relatively to shaft 3.

The shaft 6 has a worm 8, which engages the teeth of a pinion 9, and the shaft 10 of this pinion is supported in bearings in the casing and in bridge F, and said shaft carries a hand or pointer 11, which indicates on dial 12 the movement of the gearing with which it is connected. The dial is marked to indicate by units of length, such as yards, meters, feet, or other linear measures.

It is apparent that the movement of the index on the dial will have a certain relation to the distance traveled by wheel 7 on the face of plate 5 when the casing is rotated about shaft 3, and that by the interposed gear, and especially the number of teeth on pinion 9, the speed of the pointer relatively to the travel of the driving-wheel 7 will be determined.

Other known forms of driving-gear might be substituted for the worm-and-pinion gear described without changing the principle of operation of this device. An index on shaft 6 will comply with the main idea of the invention.

As the movement of the index or pointer depends both on the rotation of casing A with reference to base 1 and the distance of wheel 7 carried by said casing from the center 3, it remains, in order to utilize the device for measuring a helix or other line departing from a circle, that the casing be simultaneously rotated and shifted with reference to shaft 3.

A slide-piece 15 is guided between the sheaves D, or in their absence between the posts C. An oblique slot 16 in this slide embraces the shaft 3. The slide can shift lengthwise with reference to the casing, but in so doing, as its sides bear against the sheaves, the casing is shifted sidewise with reference to shaft 3 by reason of the inclined bearing-face of one or the other sides of the slot engaging shaft 3, and consequently the wheel 7 and the point of its contact with plate 5 will be governed by the position of slide 15.

Slide 15 has a hole 17, through which a needle or bearing-piece 18 is passed, said needle being attached to handle 19. The needle 18 is held against the coiled ribbon or cloth, and by means of the handle 19 is moved along the surface thereof and between the coils. In the instrument shown the needle is moved along constantly-diminishing circles, or, in other words, in the line of a helix, but the direction might be reversed. By traversing the needle 18 around one turn of the coil the casing A will have rotated once about the shaft 3 and the slide 15 will have shifted lengthwise as much as the needle 18 has departed from a true circle. This lengthwise shift of the slide has moved the casing and wheel 7, so that said wheel has followed the line of a helix, or whatever line has been pursued by the needle 18, and the movement of the indicator-hand has been proportional.

The obliquity or incline of the slot 16 with reference to the parallel sides of the slide is a matter of calculation based on the relation of the diameter to the circumference of a circle, and the hole 17 is at such distance from the ends of the slot as to permit the device to be used with ribbons or rolls of ordinary size, the rotation of point 17 about the center 3 determining the movement of the gearing. Hence the incline of the slot in slide 15 is with relation to hole 17 or the needle therein, rather than with the end of the slide.

It is apparent that the construction of the device may be changed in many particulars without departing from the spirit of this invention. I have described an instrument heretofore made by me and operating satisfactorily. With this as a guide, numerous modifications can be readily made.

What I claim is—

1. In a cloth-measuring machine, a base-piece provided with means for attachment to a roll or bolt of cloth or the like, a friction-surface connected to said base-piece, and a casing having a wheel with a shifting relation to said base-piece, and an indicator or registering device carried by the casing, all combined substantially as described.

2. The base-piece for attachment to the roll or bolt, the rotatable casing relatively movable thereto and carrying a wheel having frictional engagement with a friction-piece connected to the base-piece, and an inclined bearing-piece having a needle in position to engage the cloth in the roll or bolt, the incline of such piece serving to shift the wheel toward or away from the center of the friction-face, all combined substantially as described.

3. In a cloth-measuring apparatus, the combination of the support having means for attachment to the roll or bolt of cloth, the casing having a friction-wheel engaging a surface connected to the base-plate, and the slide having straight and inclined surfaces engaging the casing to shift the same, and a bearing-point to engage the cloth and by following the face thereof serve to shift the casing.

4. In a cloth-measuring machine, the slotted casing carrying a friction-wheel and registering devices, the slide having parallel sides engaging projections from the casing, and inclines engaging a shaft about which the casing rotates, and a fixed base-piece to which said shaft is connected, all combined substantially as described.

5. In a cloth-measuring machine, the base-piece, the shaft and friction-surface connected to said base-piece, the casing having a slot through which the shaft passes and having a friction-plate within the casing, a wheel engaging said plate, and a slide with inclines engaging the shaft, and having a bearing-pin thereon, all combined substantially as described.

6. In a cloth-measuring machine, the casing having a guideway, the slide moving in said guideway, the fixed base, the friction-wheel in the casing engaging a friction-piece connected to the base, and means for rotating the slide-piece about a center, substantially as described.

In testimony whereof I affix my signature in presence of two witnesses.

JOHN DARLING.

Witnesses:
H. RABBITT,
A. A. COX.